(12) United States Patent
Carlson et al.

(10) Patent No.: US 12,006,851 B2
(45) Date of Patent: Jun. 11, 2024

(54) PRESSURE FLUID HANDLING SYSTEM

(71) Applicant: FREEVALVE AB, Ängelholm (SE)

(72) Inventors: Urban Carlson, Helsingborg (SE); Rowhan Toi Neilson, Västerås (SE)

(73) Assignee: FREEVALVE AB, Ängelholm (SE)

( * ) Notice: Subject to any disclaimer, the term of this patent is extended or adjusted under 35 U.S.C. 154(b) by 473 days.

(21) Appl. No.: 17/435,228

(22) PCT Filed: Feb. 25, 2020

(86) PCT No.: PCT/SE2020/050210
§ 371 (c)(1),
(2) Date: Aug. 31, 2021

(87) PCT Pub. No.: WO2020/180227
PCT Pub. Date: Sep. 10, 2020

(65) Prior Publication Data
US 2022/0147075 A1    May 12, 2022

(30) Foreign Application Priority Data
Mar. 1, 2019   (SE) .................... 1950271-5

(51) Int. Cl.
*F01L 9/16*   (2021.01)
*F01L 9/40*   (2021.01)
(Continued)

(52) U.S. Cl.
CPC   *F01L 9/16* (2021.01); *F01L 9/40* (2021.01); *F01P 5/10* (2013.01); *F15B 1/04* (2013.01);
(Continued)

(58) Field of Classification Search
CPC ..................................... F01L 9/16; F01L 9/40
(Continued)

(56) References Cited

U.S. PATENT DOCUMENTS 10,077,689 B2   9/2018 Hoglund et al.
2007/0022987 A1   2/2007 Lou
(Continued)

FOREIGN PATENT DOCUMENTS

| DE | 102 42 547 A1 | 4/2003 |
| GB | 00449 A | 1/1909 |
| WO | 2004/070239 A2 | 8/2004 |

OTHER PUBLICATIONS

International Search Report for PCT/SE2020/050210, dated May 14, 2020, 3 pages.
(Continued)

*Primary Examiner* — Jorge L Leon, Jr.
(74) *Attorney, Agent, or Firm* — NIXON & VANDERHYE

(57) ABSTRACT

A pressure fluid handling system includes a closed pressure fluid circuit. The pressure fluid circuit includes, connected in series, a compressor and a pressure sink and a primary pressure fluid route from the compressor to the pressure sink and a secondary pressure fluid route from the pressure sink to the compressor. The pressure fluid handling system further includes a pressure fluid accumulator connected to the pressure fluid circuit via a first pressure fluid accumulator conduit. The first pressure fluid accumulator conduit includes a pump configured to pump pressure fluid from the pressure fluid circuit to the pressure fluid accumulator to lower the pressure levels in the pressure fluid circuit, and in that the pressure fluid handling system includes a controllable component for returning the pressure fluid from the pressure fluid accumulator to the pressure fluid circuit to increase the pressure levels in the pressure fluid circuit.

24 Claims, 5 Drawing Sheets

(51) Int. Cl.
  *F01P 5/10* (2006.01)
  *F15B 1/04* (2006.01)
  *F25B 45/00* (2006.01)
  *G05D 16/20* (2006.01)
(52) U.S. Cl.
  CPC .......... *F25B 45/00* (2013.01); *G05D 16/208* (2013.01); *F25B 2345/006* (2013.01); *F25B 2400/19* (2013.01); *F25B 2600/2523* (2013.01)
(58) Field of Classification Search
  USPC ..................................................... 123/90.14
  See application file for complete search history.

(56) References Cited

U.S. PATENT DOCUMENTS

| | | |
|---|---|---|
| 2013/0255240 A1 | 10/2013 | Bergemann et al. |
| 2016/0237866 A1* | 8/2016 | Hoglund ................. F15B 11/06 |

OTHER PUBLICATIONS

Written Opinion of the ISA for PCT/SE2020/050210, dated May 14, 2020, 4 pages.
Extended European Search Report issued in European Patent Application No. 20766778.3 dated Sep. 30, 2022.

* cited by examiner

PRESSURE FLUID HANDLING SYSTEM

This application is the U.S. national phase of International Application No. PCT/SE2020/050210 filed 25 Feb. 2020, which designated the U.S. and claims priority to SE Patent Application No. 1950271-5 filed 1 Mar. 2019, the entire contents of each of which are hereby incorporated by reference.

BACKGROUND OF THE INVENTION

Field of the Invention

The present invention relate s in general to a pressure fluid handling system comprising a closed pressure fluid circuit having a primary side (high pressure side) and a secondary side (low pressure side), wherein the pressure fluid handling system comprises an active device that performs useful duty and is intended to provide an altering/variable capacity over time. Thus, the pressure fluid handling system is configured to provide a variable pressure fluid flow in the pressure fluid circuit and/or a variable pressure ratio between the primary side and the secondary side and/or variable pressure levels in the primary side and in the secondary side, in order to meet changing capacity demand from the active device of the pressure fluid handling system.

The present invention is suitable for realization of so called HVAC applications (i.e. Heating, Ventilation and Air Conditioning) for indoor and especially vehicular environmental comfort, for driving/operating pneumatic devices in combustion engines (especially combustion engines of camshaft free piston engine type, which are also known under the term/concept "engines with free valves"), for driving/operating of pneumatic devices in pneumatic machines/tools, etc. Said combustion engines are suitable for powering vehicles, such as cars or trucks, boats, etc. or for powering machines such as electric power generation units, or the like.

The present invention relates in particular to a pressure fluid handling system comprising a closed pressure fluid circuit, wherein the pressure fluid circuit comprises, connected in series with each other, a compressor, a pressure sink, a primary pressure fluid route extending from the compressor to the pressure sink and a secondary pressure fluid route extending from the pressure sink to the compressor, the pressure fluid handling system further comprising a pressure fluid accumulator that is connected to the pressure fluid circuit via a first pressure fluid accumulator conduit, and to a method for controlling such a pressure fluid handling system.

In a second aspect, the present invention relates to a combustion engine comprising such a pressure fluid handling system.

Description of the Related Art

The present invention is based on the fact that many known applications in various technical fields make use of a pressure fluid flow in a closed pressure fluid circuit and makes use of a pressure difference between a primary side and a secondary side of the closed pressure fluid circuit in order to operate/drive a device or an equipment to preform useful duty.

For instance, cars and trucks have air conditioning systems that comprise or are constituted by a pressure fluid handling system, wherein the pressure fluid flow in the closed pressure fluid circuit and the pressure difference between the primary side and the secondary side is used to accomplish transitions between liquid and gas/vapour of the pressure fluid in order to heat or cool the air in the coupe of the vehicle.

For instance, combustion engines and pneumatic machines/tools having pneumatic devices/components makes use of the pressure fluid flow in the closed pressure fluid circuit and the pressure difference between the primary side and the secondary side in order to operate/drive the pneumatic device, e.g. moving an element back and forth or rotating an element.

In present HVAC applications, especially the air conditioning systems of cars and trucks, wherein the compressor of the pressure fluid handling system is driven by the combustion engine, the operational speed of the compressor is more or less constant during steady state drive of the vehicle and at idle running of the combustion engine due to constant engine speed. In such situations, the capacity of a fixed displacement compressor (or more precisely the capacity of the pressure fluid handling system) is adjusted by using an adjustable expansion valve. In such system the pressure fluid flow will increase through the expansion valve to match increased capacity demand and thereby the pressure level on the low pressure side will increase at the same time as the pressure level on the high pressure side will decrease. Thus, when the need for cooled air is at maximum, i.e. returning to the car a hot day when the car that has been parked exposed to the sun, the air conditioning system will have the poorest performance when the engine speed and the compressor speed is low. As a result, the air conditioning system has to be dimensioned to manage such situations and thereby most of the time the air conditioning system will be over-dimensioned. The same condition applies for electrically driven compressors having a fixed operational speed in other HVAC applications.

In present combustion engines having pneumatic devices/components driven/operated by a pressure fluid handling system, the compressor of the pressure fluid handling system is driven by the combustion engine and the pressure fluid flow, pressure levels and pressure ratio in the system cannot be changed faster than the operational speed of the combustion engine is changed, i.e. the capacity of the active device of the pressure fluid handling system that performs useful duty is fully dependent on the operational speed of the compressor and thereby fully dependent on the operational speed of the combustion engine.

In a camshaft free combustion engine a pressure fluid, such as a liquid or a gas, is for instance used to achieve a displacement/opening of one or more engine valves. This means that the camshafts and related equipment that conventional combustion engines use to open engine valves to let air in and let exhaust fumes out, respective, from the combustion chamber, has been replaced by a less volume demanding and more controllable system.

In an engine that is constructed for significant angular momentum outputs, e.g. performance cars, the pressure in the combustion chamber is increasing proportional to an increased angular momentum output, and the force that is required to open the valve actuator to open the, in relation to the combustion chamber inward opening, engine valve consequently also increases proportional to an increased angular momentum output. At high operational speed of the combustion engine, i.e. high numbers of revolutions, such as 6-8000 rpm, a very fast opening of the engine valve is also required for the filling of air and evacuation of exhaust fumes from the engine cylinder not to be restricted. These requirements, i.e. the need for an extremely fast opening at high frequencies in a high performance engine having high counter pressure in the combustion chamber of the engine at the opening of the exhaust valves, require the pressure of the pressure fluid upstream of the valve actuator to be high, in the order of 8-30 bar. Downstream the valve actuator, the pressure fluid has a lower pressure, in the order of 3-6 bar.

At high numbers of revolution and high engine loads, the pressure difference between the low pressure side and the high pressure side should be in the order of about 15-20 bar to achieve a correct operation of the valve actuators, and when the engine is idle running, or at low numbers of revolution and low loads, the pressure difference between the low pressure side and the high pressure side only needs to be in the order of about 2-5 bar.

In situations that require fast acceleration and/or very fast change from low numbers of revolution and low load to high numbers of revolutions and high load, for example when entering on a busy main road or at a sudden overtaking of a slow moving vehicle, the pressure levels of and the pressure difference between the low pressure side and the high pressure side must immediately be increased to achieve the acceleration that the driver requires at the same time as the pressure fluid flow has to be increased. There are known compressors, especially compressors having variable displacement, that are able to accomplish the required pressure levels and pressure difference between the low pressure side and the high pressure side, they are however not configured to satisfy the requirement of immediate/instantaneous shift from low pressure levels and pressure difference to high pressure levels and pressure difference and/or from low pressure fluid flow to high pressure fluid flow. Thus such compressors (swash plate) have low efficiency and at the same time they need to be oversized and too expensive for these applications in order to match the demand. Furthermore, there is inertia in the present systems to go from a high/great pressure difference to a low/small pressure difference and to go from a need for high pressure fluid flow to low, i.e. when the vehicle again is operated at low numbers of revolution after the short/temporary rise in numbers of revolutions/engine load, it will take time before the pressure difference and thereby the high energy consumption of the system has decreased to a desired level.

According to the applicants U.S. Pat. No. 10,077,689 a pressure fluid handling system of the initially defined type is known, wherein the system comprises a pressure fluid accumulator connected to the pressure fluid circuit via a controllable valve. The key of that patent is to save a peak pressure from the primary pressure fluid route in the pressure fluid accumulator. Thus, the pressure fluid accumulator is primed when the pressure demand, the pressure levels in the pressure fluid circuit and the operational speed of the compressor are at maximum.

Thus, there is a need to provide a pressure fluid handling system that over time is capable of controlling/varying the capacity of the active device of the pressure fluid handling system that performs useful duty independently on the operational speed of the compressor.

SUMMARY OF THE INVENTION

The aim of the present invention is to set aside the abovementioned drawbacks and shortcomings of the previously known pressure fluid handling systems and to provide an improved pressure fluid handling system.

A primary object of the present invention is to provide a pressure fluid handling system of the initially defined type which is configured to provide a variable pressure fluid flow in the pressure fluid circuit and/or a variable pressure ratio between the primary side and the secondary side and/or variable pressure levels in the primary side and the secondary side, in order to meet changing capacity requirements from the active device of the pressure fluid handling system.

It is another object of the present invention to provide a pressure fluid handling system that is arranged to be able to immediately increase the pressure difference between the primary (high) pressure side and the secondary (low) pressure side at the need of a rapid increase in capacity demand from the active device of the pressure fluid handling system.

It is another object of the present invention to provide a pressure fluid handling system that rapidly can go from a great pressure difference to a small pressure difference between the low pressure side and the high pressure side.

It is another object of the present invention to provide a pressure fluid handling system, wherein the pressure fluid accumulator is primed when the capacity demand is low.

According to the invention at least the primary object is attained by means of the initially defined pressure fluid handling system and by means of a combustion engine as disclosed and claimed.

According to a first aspect of the present invention, there is provided a pressure fluid handling system of the initially defined type, which is characterized in that the first pressure fluid accumulator conduit comprises a pump configured to pump pressure fluid from the pressure fluid circuit to the pressure fluid accumulator in order to lower the pressure levels in the pressure fluid circuit, and in that the pressure fluid handling system comprises at least one controllable component for returning the pressure fluid from the pressure fluid accumulator to the pressure fluid circuit in order to increase the pressure levels in the pressure fluid circuit.

According to a second aspect of the present invention, there is provided a combustion engine of the initially defined type comprising such a pressure fluid handling system.

According to a third aspect of the present invention, there is provided a method for controlling such a pressure fluid handling system.

The present invention is thus based on the insight that thanks to the pump and the pressure fluid accumulator the amount/density of the pressure fluid in the closed pressure fluid circuit is effectively and immediately adjusted in order to match the varying capacity demand from the active device of the pressure fluid handling system independently on the operational speed of the compressor.

During normal (i.e. low load) and steady state operation the pressure levels in the pressure fluid circuit can be quite low, and in such situations the pump transports pressure fluid from the pressure fluid circuit to the pressure fluid accumulator and creates an elevated pressure in the pressure fluid accumulator exceeding the highest possible pressure level in primary pressure fluid route, in order to later being able to rapidly supply the stored volume of pressure fluid under high pressure back to the pressure fluid circuit, for the purpose of achieving an immediate pressure increase in the primary pressure fluid route and increased pressure level difference independently of the operational speed of the compressor.

According to a preferred embodiment of the present invention, the pressure fluid accumulator is connected to the primary pressure fluid route of the pressure fluid circuit via the first pressure fluid accumulator conduit. Thereby, more rapid decrease in pressure levels in the pressure fluid circuit will be obtained and thereby decreased energy consumption.

According to a preferred embodiment of the present invention, the at least one controllable component is constituted by a first controllable valve configured to return pressure fluid from the pressure fluid accumulator to the primary pressure fluid route of the pressure fluid circuit. Thereby, more rapid increase in pressure levels and pressure level difference in the pressure fluid circuit will be obtained.

According to a preferred embodiment of the present invention, the compressor is a fixed displacement scroll compressor, entailing all known advantages of a scroll compressor in relation to corresponding piston compressors regarding noise, efficiency, size, etc.

According to a preferred embodiment of the present invention, the at least one controllable component is constituted by a second controllable valve configured to return pressure fluid from the pressure fluid accumulator to the secondary pressure fluid route. Thereby, extra increase in pressure levels in the pressure fluid circuit will be obtained.

Further advantages with and features of the invention are evident from the following detailed description of preferred embodiments.

BRIEF DESCRIPTION OF THE DRAWINGS

A more complete understanding of the abovementioned and other features and advantages of the present invention will be evident from the following detailed description of preferred embodiments with reference to the enclosed drawings, in which.

DESCRIPTION OF THE PREFERRED EMBODIMENTS

Figure 1:
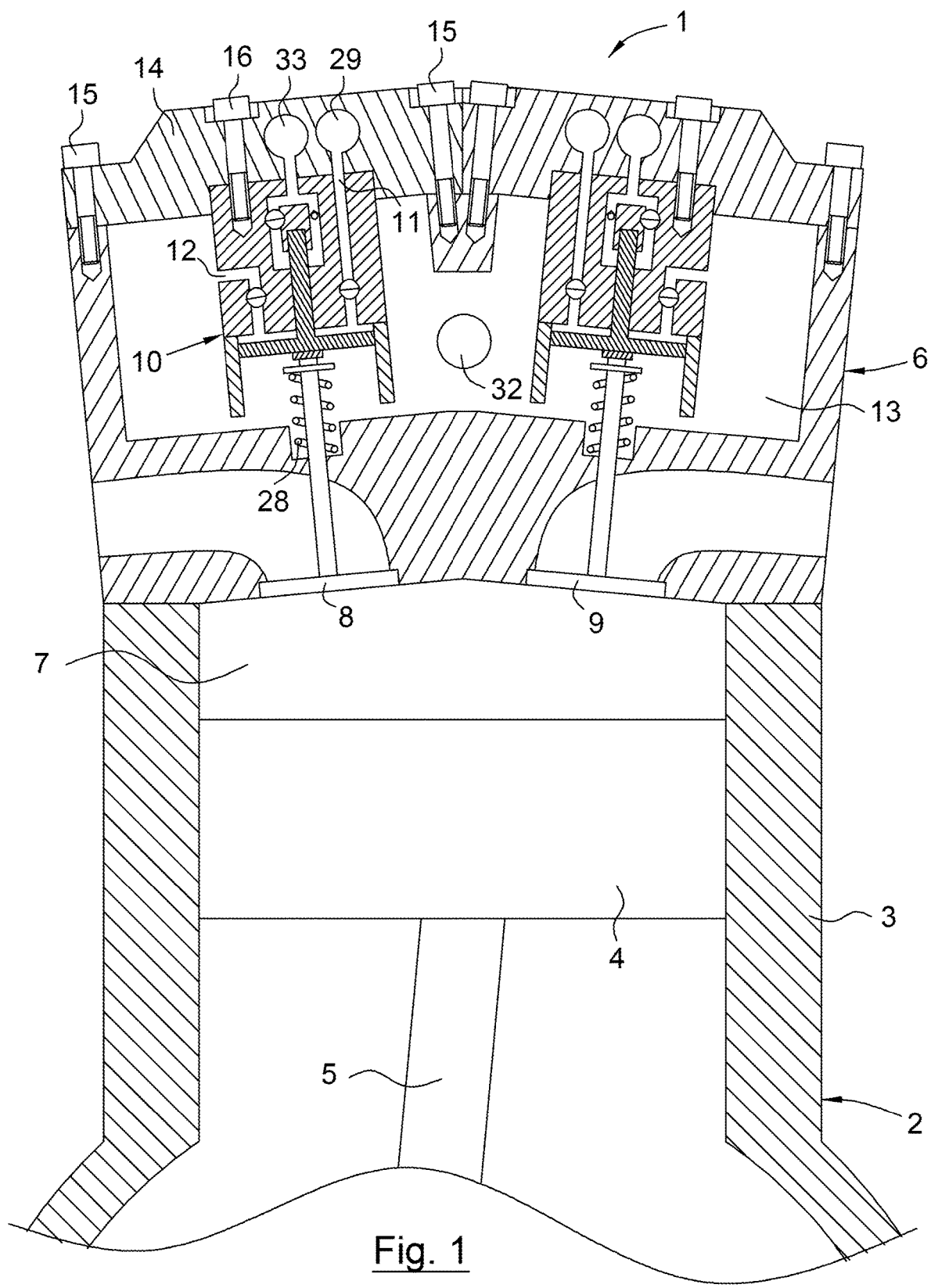
FIG. 1 is a schematic cross-sectional side view of a part of a combustion engine.

Reference is initially made to FIG. 1 that is a schematic illustration of a part of a combustion engine, generally designated 1, comprising an inventive pressure fluid handling system. The combustion engine 1 comprises a cylinder block 2 with at least one cylinder 3. Said cylinder block 2 generally comprises three, four or more cylinders 3. In the shown embodiment reference is made only to one cylinder 3, it should nevertheless be realized that the equipment described below in relation to the shown cylinder 3 is preferably applied to all of the cylinders of the combustion engine 1, in the embodiment the combustion engine comprises more than one cylinder.

Furthermore, the combustion engine 1 comprises a piston 4 that is axially displaceable in said cylinder 3. The movement, axial displacement back and forth, of the piston 4 is transferred in a conventional manner to a connection rod 5 connected to the piston 4, the connection rod 5 in turn is connected to and drives a crank shaft (not shown) in rotation.

The combustion engine 1 also comprises a cylinder head 6 that together with said cylinder 3 and said piston 4 delimits a combustion chamber 7. In the combustion chamber 7 the ignition of a mix of fuel and air/gas occurs in a conventional manner and is not further described herein. The cylinder head 6 comprises at least one controllable first engine valve 8, also known as a gas exchange valve. In the shown embodiment, the cylinder head also comprises a controllable second engine valve 9. The one engine valve 8 constitutes, in the shown embodiment, an inlet valve that is arranged to open/close for supply of air/gas to the combustion chamber 7, and the second engine valve 9 constitutes in the shown embodiment an outlet valve, or exhaust valve, that is arranged to open/close for evacuation of exhausts from the combustion chamber 7.

The combustion engine 1 further comprises a first valve actuator, generally designated 10, that is operatively connected to said first engine valve 8 and that is arranged in a closed pressure fluid circuit of the combustion engine 1. The valve actuator 10 in turn comprises a pneumatic pressure fluid circuit with at least one inlet opening 11 for pressure fluid and at least one outlet opening 12 for pressure fluid. The pressure fluid in this embodiment is a gas or a gas mixture, preferably air or nitrogen gas. Air has the advantage that it is easy to change the pressure fluid or to supply more pressure fluid if the closed pressure fluid circuit leak, and nitrogen gas has the advantage that it lacks oxygen, which prevents oxidation of other elements.

In the case the combustion engine 1 comprises several valve actuators these are arranged in parallel to one another in said closed pressure fluid circuit. Each valve actuator can be operatively connected to one or more engine valves, the combustion engine may for example comprise two air inlet valves 8, which are jointly driven by the same valve actuator 10. Nevertheless, it is preferred that each valve actuator operates one engine valve each to achieve the greatest possible controllability of the operation of the combustion engine 1. The valve actuator 10 is the active device/component of the pressure fluid handling system that performs useful duty, i.e. a movement back and forth that is used to displace an engine valve or another element. The valve actuator 10 is a pressure sink in the pressure fluid circuit in such combustion engine 1 applications.

The description below of the combustion engine will only embrace one engine valve 8 and one valve actuator 10, but it should be realized that the corresponding also applies to all engine valves and valve actuators if nothing else is said.

The combustion engine 1 also comprises a cylinder head chamber 13 that preferably forms part of said closed pressure fluid circuit and that is delimited by said cylinder head 6 and at least a first cylinder head mantle 14. In the shown embodiment, the cylinder head mantle 14 is divided in two halves, which are individually attachable to and releasable from the cylinder head 6 by way of bolts 15 or the like. The cylinder head chamber 13 preferably presents a volume in the order of 1-3 liters. In an alternative embodiment, only one cylinder head mantle 14 is present that, together with the cylinder head 6, delimits the cylinder head chamber 13.

In the embodiment disclosed in FIG. 1, the at least one outlet opening 12 of the valve actuator 10 is in fluid communication with the cylinder head chamber 13, i.e. that the pressure fluid leaving the valve actuator 10 via said at least one outlet opening 12 flows out into the cylinder head chamber 13. In those cases where the combustion engine 1 comprises several valve actuators, all outlet openings of the valve actuators for pressure fluid discharge the pressure fluid into the same cylinder head chamber.

Preferably, the whole of the valve actuator 10 is arranged in said cylinder head chamber 13, and it is also preferred that the valve actuator 10 is releasably connected to said cylinder head mantle 14, for example by a bolt 16, or similar holding means. In this embodiment, the valve actuator 10 accordingly "hangs" in the cylinder head mantle 14 without being in contact with the cylinder head 6. According to other embodiments the valve actuator 10 is also connected to the bottom of the cylinder head 6, or is only connected to the bottom of the cylinder head 6.

Figure 2:
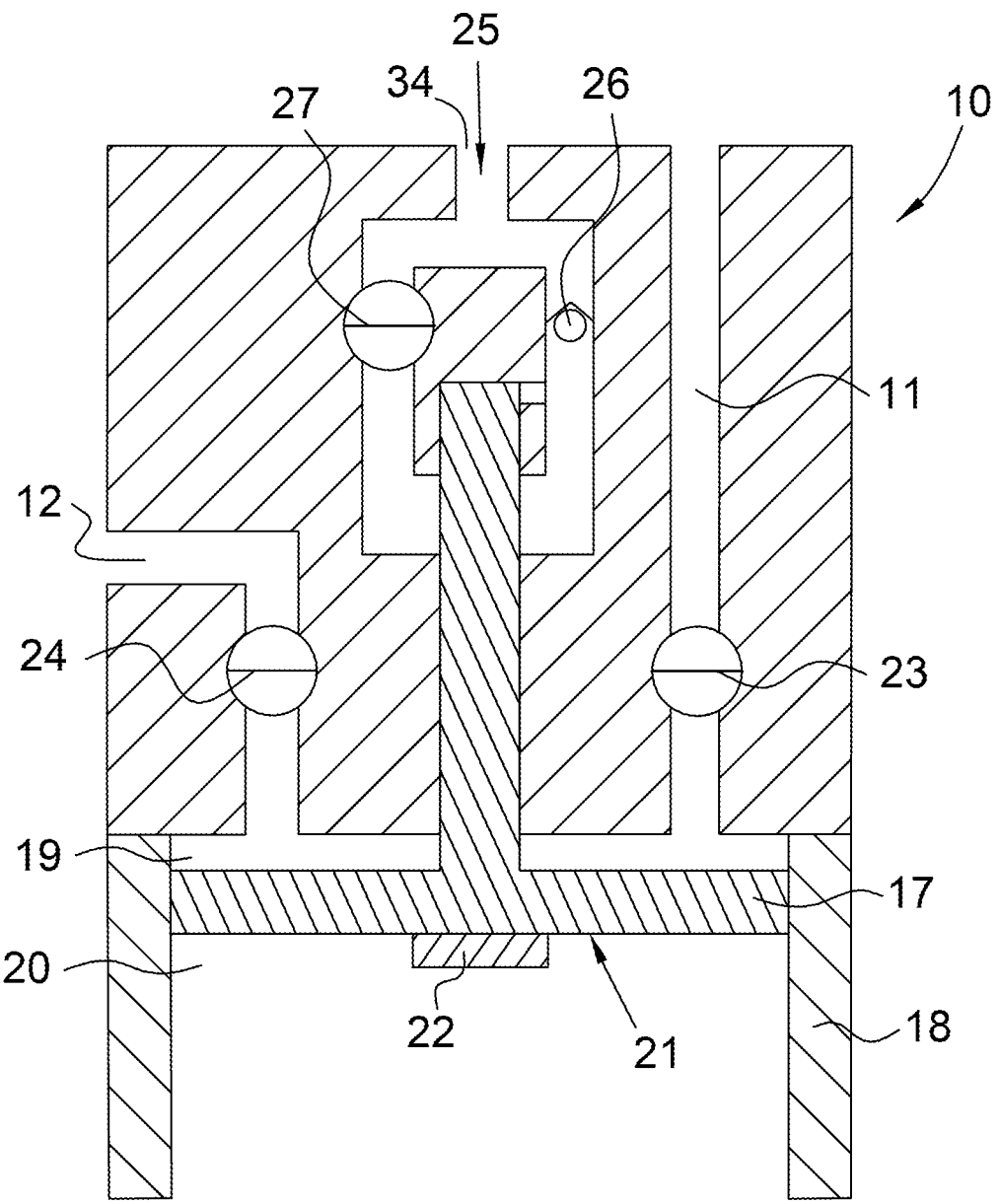
FIG. 2 is a schematic cross-sectional side view of a valve actuator.

Reference is now made to FIG. 2, which disclose a schematic illustration of the valve actuator 10.

The valve actuator 10 comprises an actuator piston disc 17 and an actuator cylinder 18 delimiting a cylinder volume. In the disclosed embodiment said cylinder volume is a downward open cylinder volume but it is also conceivable that the lower part of the cylinder volume has openings in the radial direction. The actuator piston disc 17 divides said cylinder volume in a first upper part 19 and a second lower part 20 and is axially displaceable in said actuator cylinder 18. The actuator piston disc 17 forms part of an actuator piston, generally designated 21, that is arranged to contact and drive said first engine valve 8. The actuator piston 21 may further comprise means 22 for play elimination in axial direction in relation to said first engine valve 8. The play eliminating means 22 are preferably hydraulic, and assures that when the actuator piston disc 17 is in its upper dead position, the actuator piston 21 remains in contact with the first engine valve 8 when it is closed, for the purpose of correcting for assembly tolerances, heat expansion, etc. Accordingly, the axial length of the actuator piston 21 is adjusted by way of the play eliminating means 22.

The second part 20 of the cylinder volume of the valve actuator 10 is in fluid communication with said cylinder head chamber 13. This way, it is guaranteed that the same pressure acts on the actuator piston disc 17 from the first part 19 of the cylinder volume respective from the second part 20 of the cylinder volume when the actuator piston 21 is in the upper dead position. Thereby, the sealing between the actuator piston disc 17 and the actuator cylinder 18 is not critical, but some leakage can be allowed for minimizing the resistance to displacement of the actuator piston disc 17, and in resting position the actuator piston disc 17 is not affected by changes in the pressure level in the cylinder head chamber 13.

The valve actuator 10 comprises a controllable inlet valve 23 that is arranged to open/close the inlet opening 11, a controllable outlet valve 24 that is arranged to open/close the outlet opening 12, a hydraulic circuit, generally designated 25, that in turn comprises a non-return valve 26 arranged to allow filling of the hydraulic circuit 25, and a controllable emptying valve 27 arranged to control the emptying of the hydraulic circuit 25. It should be pointed out that the valves in the valve actuator 10 are schematically depicted and can for example be constituted by sliding valves, seat valves, etc. Furthermore, several of the abovementioned controllable valves may be constituted by a single body. Each valve can further be directly or indirectly electrically controlled. With directly electrically controlled is meant that the position of the valve is directly controlled by, for example, an electro-magnetic device, and with indirect electrically controlled is meant that the position of the valve is controlled by a pressure fluid that in turn is controlled by, for example, an electro-magnetic device.

To achieve a displacement of the actuator piston disc 17 downward for opening the engine valve 8, the inlet valve 23 is opened to allow a filling of pressure fluid with high pressure in the upper part 19 of the cylinder volume. When the actuator piston 21 is displaced downward, the non-return valve 26 of the hydraulic circuit 25 opens, whereupon hydraulic liquid is sucked in and replaces the volume that the actuator piston 21 leaves. Thereafter, the inlet valve 23 is closed and the pressure fluid that has entered in the upper part 19 of the cylinder volume is allowed to expand, whereupon the actuator piston disc 17 continues its movement downward. When the pressure fluid in the upper part 19 of the cylinder volume is not able to displace the actuator piston disc 17 further, i.e. when the pressure on the underside of the actuator piston disc 17 and the return spring 28 of the engine valve 8 is as high as the pressure on the upper side of the actuator piston disc 17, the actuator piston 21 stops. It shall be pointed out that the actuator piston 21 also has some inertia making the actuator piston 21 to overshoot the position of the force equilibrium. The actuator piston 21 is held (locked) in its lower position a desired amount of time by keeping the emptying valve 27 of the hydraulic circuit 25 closed at the same time as the non-return valve 26 of the hydraulic circuit 25 is automatically closed. To achieve a return movement, the outlet valve 24 is opened to allow an evacuation of pressure fluid from the upper part 19 of the cylinder volume, and additionally the emptying valve 27 of the hydraulic circuit 25 is opened, whereupon the actuator piston 21 is displaced upward when the hydraulic liquid is discharged/evacuated from the hydraulic circuit 25, and at the same time, the pressure fluid is discharged/evacuated from the upper part 17 of the cylinder volume to the cylinder head chamber 13 via the outlet opening 12.

Figure 3:
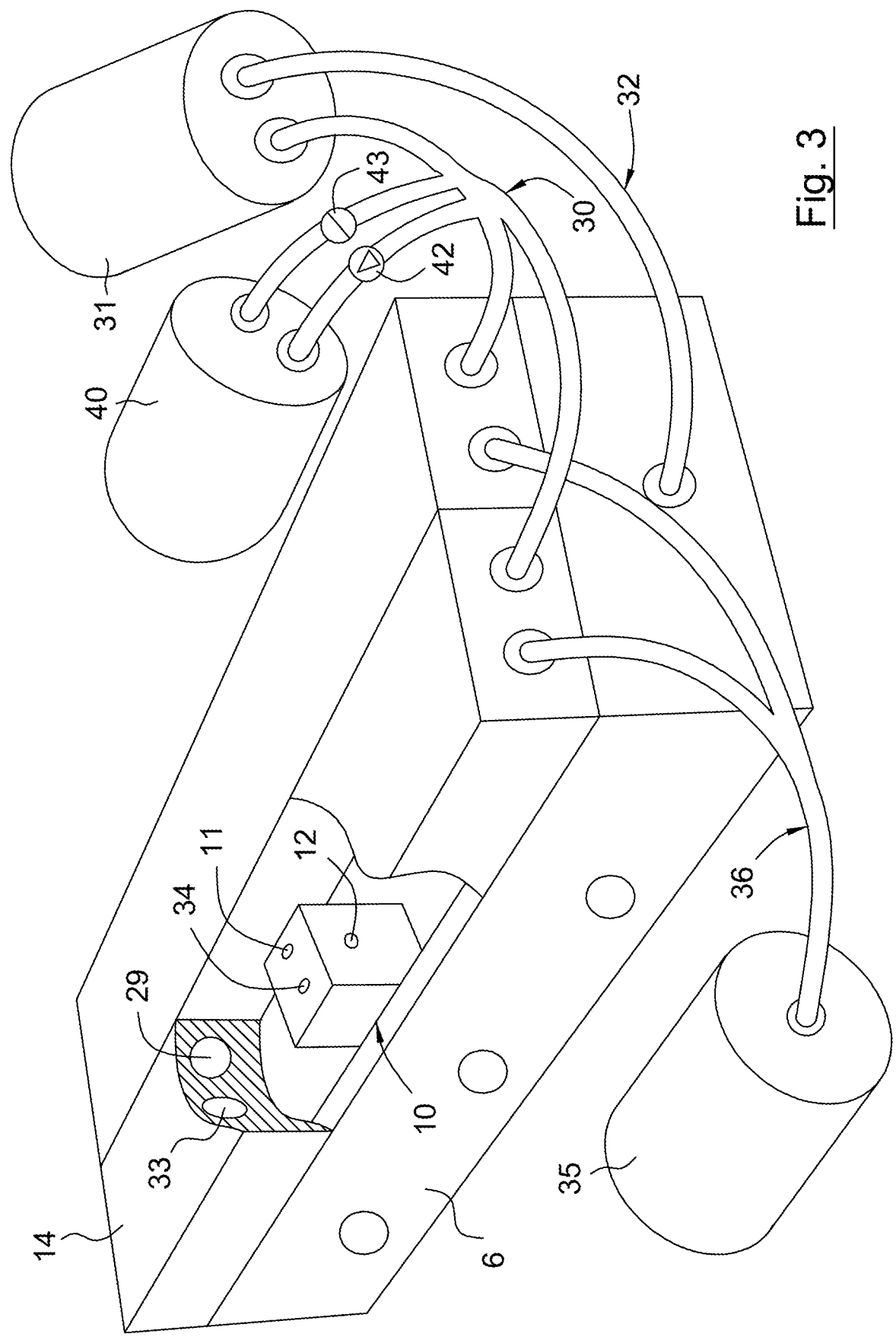
FIG. 3 is a partly cross-sectional schematic perspective view of a cylinder head.

Reference is now made primarily to FIG. 3, which shows a partly cross-sectional schematic perspective view of, among other things, a cylinder head 6 and the components of the pressure fluid handling system.

The cylinder head mantle 14 comprises a pressure fluid manifold 29 that is connected to the at least one inlet opening 11 of the valve actuator 10. The pressure fluid manifold 29 extends along the axial length of the cylinder head mantle 14. Said pressure fluid manifold 29 forms part of a primary pressure fluid route 30 that extends from a compressor 31 to the at least one inlet opening 11 of the valve actuator 10. The compressor 31 is arranged to supply a flow of pressure fluid under high pressure to the valve actuators. Furthermore, a secondary pressure fluid route 32 (see also FIG. 1) extends from the valve actuator 10 via the cylinder head chamber 13 to said compressor 31. The compressor 31 is part of both the primary pressure fluid route 30 and the secondary pressure fluid route 32.

The volume of the primary pressure fluid route 30, high pressure side, shall be kept as small as possible so that the temperature of the pressure fluid will sink as little as possible from the compressor 31 to the valve actuator 10. The volume of the secondary pressure fluid route 32 including the cylinder head chamber 13, low pressure side, shall on the other hand be greater than the volume of the primary pressure fluid route 30 so that the pressure ratio between the low pressure side and the high pressure side is affected as little as possible when the compressor 31 pulls pressure fluid from the low pressure side. Preferably, the volume of the cylinder head chamber 13 and the secondary pressure fluid route 32 is equal to or more than four times the volume of the primary pressure fluid route 30, and preferably equal to or less than ten times the volume of the primary pressure fluid route 30.

The compressor 31 has preferably a fixed displacement compressor, and generally the compressor 31 is driven by the crank shaft of the combustion engine 1. At high numbers of revolutions and high load, higher pressure of the pressure fluid in the primary pressure fluid route 30 is required, and at low numbers of revolutions and low load, lower pressure of the pressure fluid in the primary pressure fluid route 30 is required. The pressure difference between the high pressure side and the low pressure side is in the order of 10-20 bar at high numbers of revolution and high load and in the order of 2-6 bar at low numbers of revolution and low load. The compressor 31 is preferably of the scroll compressor type driven by the crank shaft of the combustion engine 1.

The pressure level on the high pressure side in in the order of 5-25 bar to, with sufficient speed, open an inward opening engine valve where a high counter pressure is present in the combustion chamber, and the pressure level on the low pressure side is in the order of 1-8 bar.

The cylinder head mantle 14 further comprises a hydraulic liquid manifold 33 that is connected to an inlet opening 34 of said hydraulic circuit 25 of the valve actuator 10. The hydraulic liquid manifold 33 extends along the axial length of the cylinder head mantle 14, parallel to the pressure fluid manifold 29. A pump 35, or the like, is arranged to supply a pressurized hydraulic liquid to the hydraulic liquid manifold 33 via a conduit 36. Hydraulic liquid will collect at the bottom of the cylinder head chamber 13 and the pump 35 will direct from the cylinder head chamber 13 or indirect via an oil tank/vessel of the combustion engine 1, use the accumulated hydraulic liquid to supply the conduit 36 with pressurized hydraulic liquid. The cylinder head mantle 14 further comprises all necessary electric infrastructure (not shown) for, among other things, controlling the first valve actuator 10, for various sensors, etc.

Figure 4:
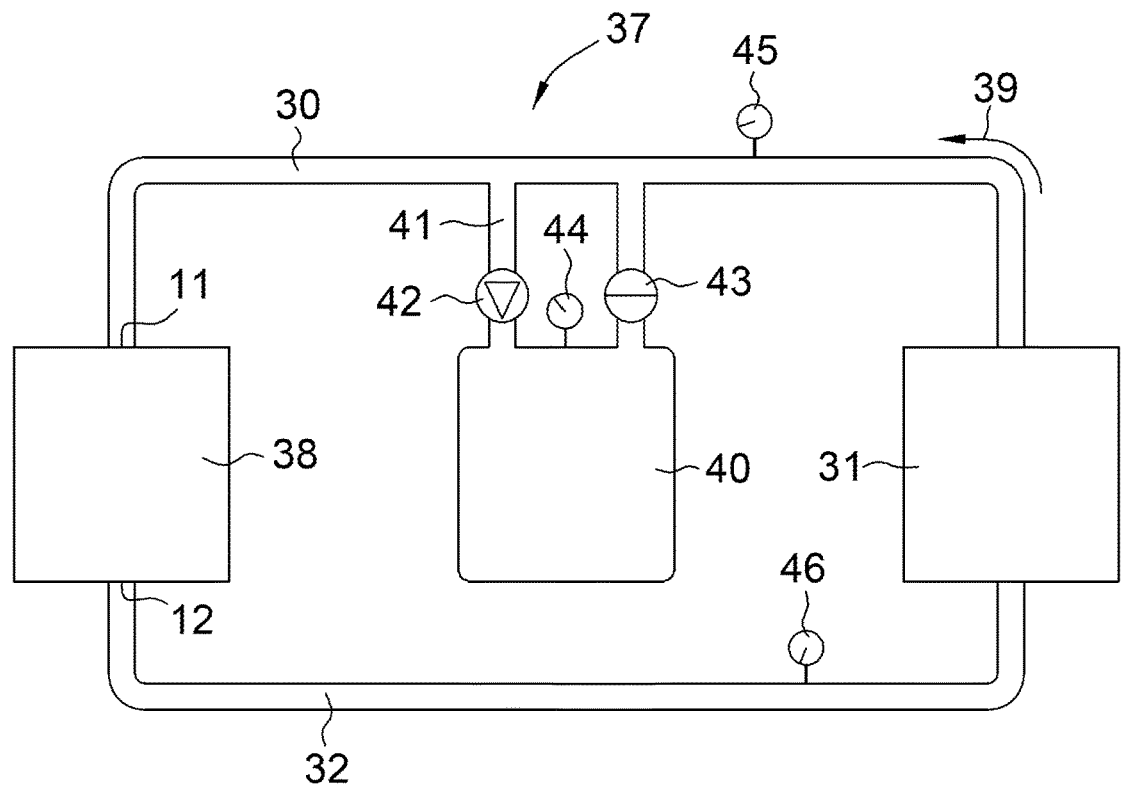
FIG. 4 is a schematic circuit diagram disclosing a basic exemplary embodiment of an inventive pressure fluid handling system.

Reference is now made to FIG. 4, which schematically illustrates a basic embodiment of an inventive pressure fluid handling system 37 that is common for several different applications.

In FIG. 4, the pressure fluid handling system 37 comprises a closed/endless pressure fluid circuit comprising, connected in series with each other, the compressor 31 arranged to the right, the primary pressure fluid route 30 (high pressure side) arranged at the upper edge, a pressure sink 38 arranged to the left, and a secondary pressure fluid route 32 (low pressure side) arranged at the lower edge. The primary pressure fluid route 30 extends from the compressor 31 i.e. from the compression space of the compressor 31, to the pressure sink 38. The secondary pressure fluid route 32 extends from the pressure sink 38 to the compressor 31, i.e. to the compression space of the compressor 31. The pressure fluid thus flows counter-clockwise in FIG. 4, which is illustrated by way of an arrow 39. The closed pressure fluid circuit is also known as operating circuit/loop. Thereto the pressure fluid handling system 37 comprises a pressure fluid accumulator/tank 40 that is connected to the pressure fluid circuit via a first pressure fluid accumulator conduit 41.

Essential to the present invention, i.e. the pressure fluid handling system 37, is that the first pressure fluid accumulator conduit 41 comprises a pump 42 configured to pump pressure fluid from the pressure fluid circuit to the pressure fluid accumulator 40 in order to lower the pressure levels in the pressure fluid circuit when the capacity demand is low. It is also essential that the pressure fluid handling system 37 comprises at least one controllable component for returning the pressure fluid from the pressure fluid accumulator 40 to the pressure fluid circuit in order to increase the pressure levels in the pressure fluid circuit when the capacity demand is high. When the pump 42 removes pressure fluid from the pressure fluid circuit, the density/amount of the pressure fluid that remains in the pressure fluid circuit will decrease and thereby the pressure levels in the pressure fluid circuit will decrease. When the pressure fluid is returned to the pressure fluid circuit, the density/amount of the pressure fluid present in the pressure fluid circuit will increase and thereby the pressure levels in the pressure fluid circuit will increase.

The pump 42 is preferably constituted by an electric pump or is constituted by a pump driven by or in parallel to the compressor 31, i.e. in a combustion engine application both the pump 42 and the compressor 31 may be driven by the crank shaft of the combustion engine 1. The pump 42 shall be configured to be operated in an ON/OFF mode, and when the pump 42 is active/ON the operational speed of the pump 42 is constant or variable. The pump 42 may comprise an internal or supplementary non-return valve so that when the pump 42 is deactivated the pressure level in the pressure fluid accumulator 31 is remained.

According to the basic embodiment illustrated in FIG. 4 the pressure fluid accumulator 40 is connected to the primary pressure fluid route 30 of the pressure fluid circuit via the first pressure fluid accumulator conduit 41. The density of the pressure fluid in the primary pressure fluid route 30 is higher than in the secondary pressure fluid route 32. Thus, when the pump 42 is active and removes pressure fluid from the pressure fluid circuit, the removal of pressure fluid is more efficient/faster when the pump 42 is operatively connected to the primary pressure fluid route 30 than to the secondary pressure fluid route 32.

According to the basic embodiment illustrated in FIG. 4 the at least one controllable component is constituted by a first controllable valve 43 configured to return pressure fluid from the pressure fluid accumulator 40 to the pressure fluid circuit. Preferably the first controllable valve 43 is configured to return pressure fluid from the pressure fluid accumulator 40 to the primary pressure fluid route 30 of the pressure fluid circuit. According to one embodiment the first controllable valve 43 is configured to return pressure fluid from the pressure fluid accumulator 40 to the compressor 31, i.e. to the compression chamber of the compressor 31, when the fluid communication between the compression chamber and the secondary pressure fluid route 32 is ended and before the compression chamber is in fluid communication with the primary pressure fluid route 30.

At the need of a rapid pressure increase in the primary pressure fluid route 30 (high pressure side) from a low pressure level to a high pressure level, i.e. at an increased capacity demand from the pressure fluid handling system 37, for example as a response to the accelerator pedal in the vehicle being pushed down and/or that the number of revolutions of the combustion engine rapidly increases or increased/boosted air conditioning demand or an accelerated operation of a pneumatic machine/tool, etc., the first controllable valve 43 is opened in order to quickly return pressure fluid from the pressure fluid accumulator 40 to the pressure fluid circuit. According to the basic embodiment disclosed in FIG. 4, the pressure fluid in the pressure fluid accumulator 40 flows into the primary pressure fluid route 30 and provides an immediate pressure rise in the primary pressure fluid route 30, i.e. an immediate response to the increased capacity demand. The pressure level in the pressure fluid accumulator 40 will decrease and the pressure level in the primary pressure fluid route 30 will increase until they are equal to each other, this is accomplished within parts of a second. Thereafter the first controllable valve 43 is closed. The volume of the pressure fluid accumulator 40 is preferably in the range three to six times greater than the volume in the primary pressure fluid route 30.

Preferably, a first pressure sensor 44 is connected to the pressure fluid accumulator 40, and a second pressure sensor 45 is connected to the primary pressure fluid route 30, to ensure that the pressure level in the pressure fluid accumulator 40 is higher than the pressure level in the primary pressure fluid route 30 before the first controllable valve 43 is opened. In the shown embodiment, also a third pressure sensor 46 is connected to the secondary pressure fluid route 32 to be able to determine the pressure ratio between the low pressure side and the high pressure side.

According to an alternative embodiment the at least one controllable component is constituted by a return pump configured to pump pressure fluid from the pressure fluid accumulator 40 back to the pressure fluid circuit, preferably back to the primary pressure fluid route 30. The return pump may be used instead of said first controllable valve 43, or preferably as a complement to said first controllable valve 43. When using only the first controllable valve 43 to return pressure fluid to the primary pressure fluid route 30, the return of pressure fluid will stop when the pressure levels in the pressure fluid accumulator 40 and the primary pressure fluid route 30 are equal to each other. By using a return pump more pressure fluid may be returned to the primary pressure fluid route 30, i.e. the pressure level in the primary pressure fluid route 30 may then be increased further and exceed the pressure level in the pressure fluid accumulator 40. According to one embodiment the pump 42 and said return pump are constituted by a single bi-directional/reversible pump.

Figure 5:
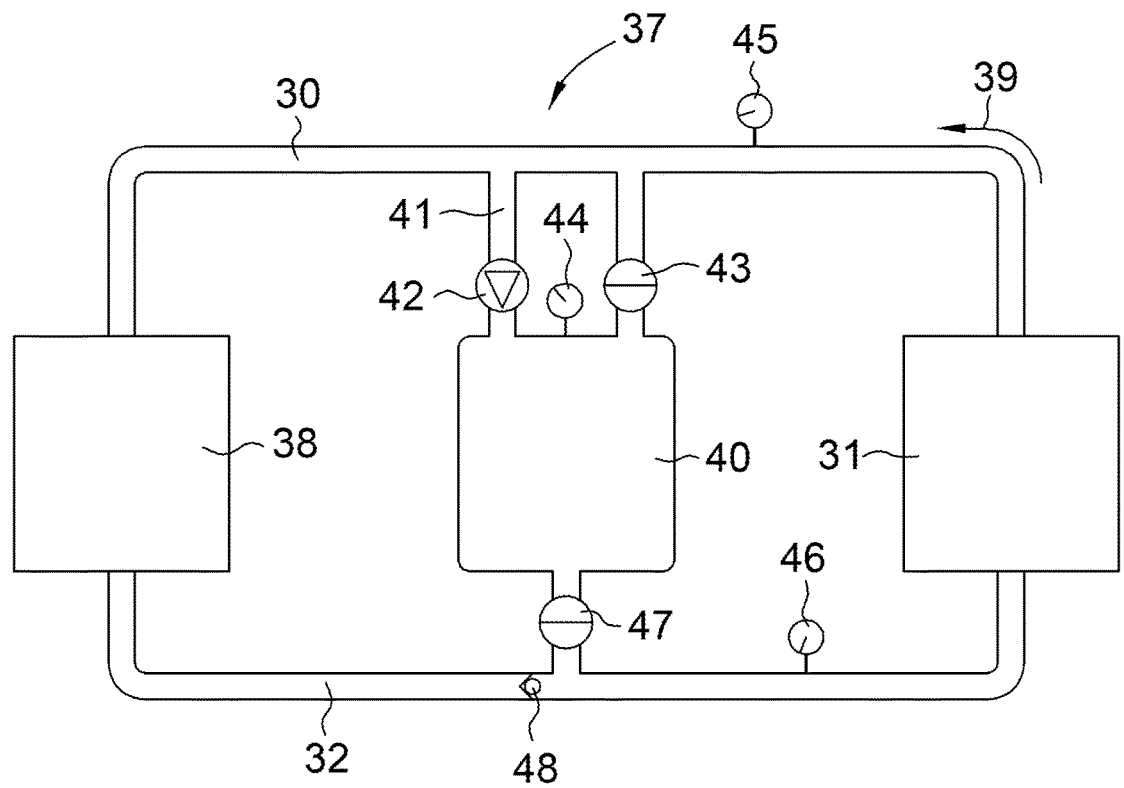
FIG. 5 is a schematic circuit diagram disclosing a second exemplary embodiment of a pressure fluid handling system for controlling a pneumatic device.

Reference is now made to FIG. 5, which disclose a second embodiment. Only differences in relation to the basic embodiment according to FIG. 4 will be described. The embodiment disclosed in FIG. 5 is especially suitable for pneumatic applications, i.e. combustion engine applications and pneumatic machine/tool applications, wherein the pressure fluid handling system 37 comprises a pneumatic closed pressure fluid circuit. In such applications the pressure sink 38 is constituted by a pneumatic device/component, i.e. a device operated/driven by the pressure fluid flow and the pressure levels of and/or pressure difference between the primary pressure fluid route 30 and the secondary pressure fluid route 32, i.e. the stored energy in the pressure fluid in the primary pressure fluid route 30 is used to obtain mechanical movement in the pressure sink 38 (pneumatic device/component) and the pressure in the pressure fluid will thereby decrease. Thus, the pressure sink 38 is constituted by a pneumatic device/component, i.e. for instance a valve actuator 10 of a combustion engine 1 or another pneumatic device of a combustion engine or a pneumatic device of a pneumatic machine/tool. In such applications the pneumatic device has a requirement for variable pressure fluid flow in the pressure fluid circuit and/or variable pressure ratio between the primary pressure fluid route 30 and the secondary pressure fluid route 32 and/or variable pressure levels in the primary pressure fluid route 30 and the secondary pressure fluid route 32.

In a combustion engine 1 application the pump 42 may be located in the cylinder head chamber 13 and/or in the cylinder head mantle 14.

According to the embodiment disclosed in FIG. 5, the at least one controllable component is also constituted by a second controllable valve 47 configured to return pressure fluid from the pressure fluid accumulator 40 to the secondary pressure fluid route 32. Thus, pressure fluid is initially returned to the primary pressure fluid route 30 via the first controllable valve 43 until the pressure level in the pressure fluid accumulator 40 is equal to the pressure level in the primary pressure fluid route 30, thereafter the pressure fluid is returned to the secondary pressure fluid route 32 via the second controllable vale 47 at most until the pressure level in the pressure fluid accumulator 40 is equal to the pressure level in the secondary pressure fluid route 32. By increasing the pressure level upstream (low pressure side) the compressor 31 the pressure level downstream (high pressure side) the compressor 31 will increase further. When recharging the pressure fluid accumulator 40 the first controllable valve 43 may be opened in order to obtain an immediate drop in the pressure level in the primary pressure fluid route 30 until the decreasing pressure level in the primary pressure fluid route 30 is equal to the increasing pressure level in the pressure fluid accumulator 40, thereafter or concurrently the pump 42 is activated to further increase the pressure level in the pressure fluid accumulator 40 and to further decrease the pressure level in the primary pressure fluid route 30.

Thereto, it is preferred that a non-return valve 48 is arranged in the secondary pressure fluid route 32 upstream the position where the second controllable valve 47 is configured to return pressure fluid to the secondary pressure fluid route 32, wherein the non-return valve 48 is arranged to allow a flow in a direction towards the compressor 31. Thereby preventing that the returned pressure fluid has a negative effect at the outlet of the pressure sink 38 (valve actuator 10).

According to one embodiment the second controllable valve 47 is configured to return pressure fluid from the pressure fluid accumulator 40 to the compressor 31, i.e. to the compression chamber of the compressor 31, when the fluid communication between the compression chamber and the secondary pressure fluid route 32 is ended and before the compression chamber is in fluid communication with the primary pressure fluid route 30.

Figure 6:
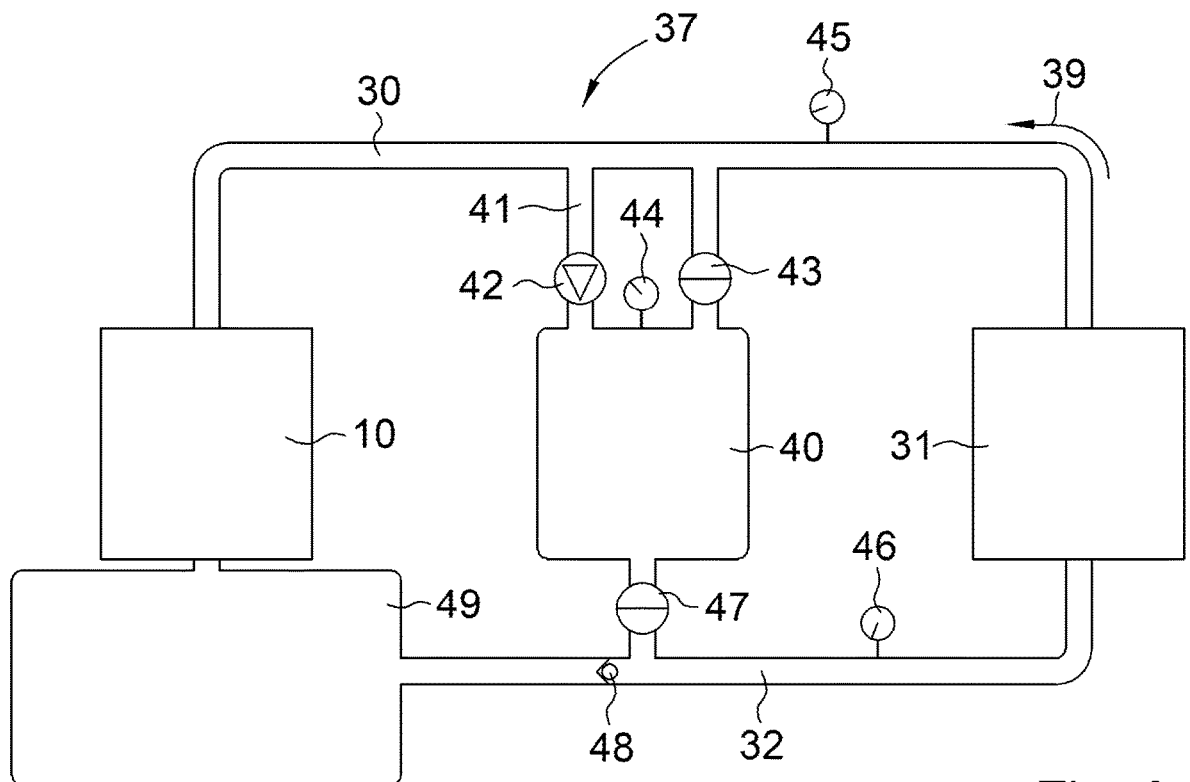
FIG. 6 is a schematic circuit diagram disclosing a third exemplary embodiment of a pressure fluid handling system for controlling a pneumatic device in a combustion engine.

Reference is now made to FIG. 6, which disclose a third embodiment. Only differences with respect to the embodiments according to FIGS. 4 and 5 will be described. In addition to the embodiment disclosed in FIG. 5, the embodiment disclosed in FIG. 6 comprises a chamber 49 that is part of the pressure fluid circuit. The chamber 49 is connected in series with the compressor 31 and the pressure sink 38 (pneumatic device/valve actuator 10), wherein the chamber 49 is part of the secondary pressure fluid route 32. In a combustion engine application the chamber 49 is constituted by the cylinder head chamber 13. The chamber 49 is preferably arranged directly downstream the pressure sink 38. It shall be pointed out that the chamber 49 may be included in the embodiments disclosed in FIGS. 4 and 5, and the second controllable valve 47 may be omitted in the embodiment disclosed in FIG. 6.

In combustion engine applications the pressure fluid accumulator 40 is preferably constituted by one or more internal cavities in the structural part of the cylinder head 6, i.e. in the walls of the cylinder head 6.

Figure 7:
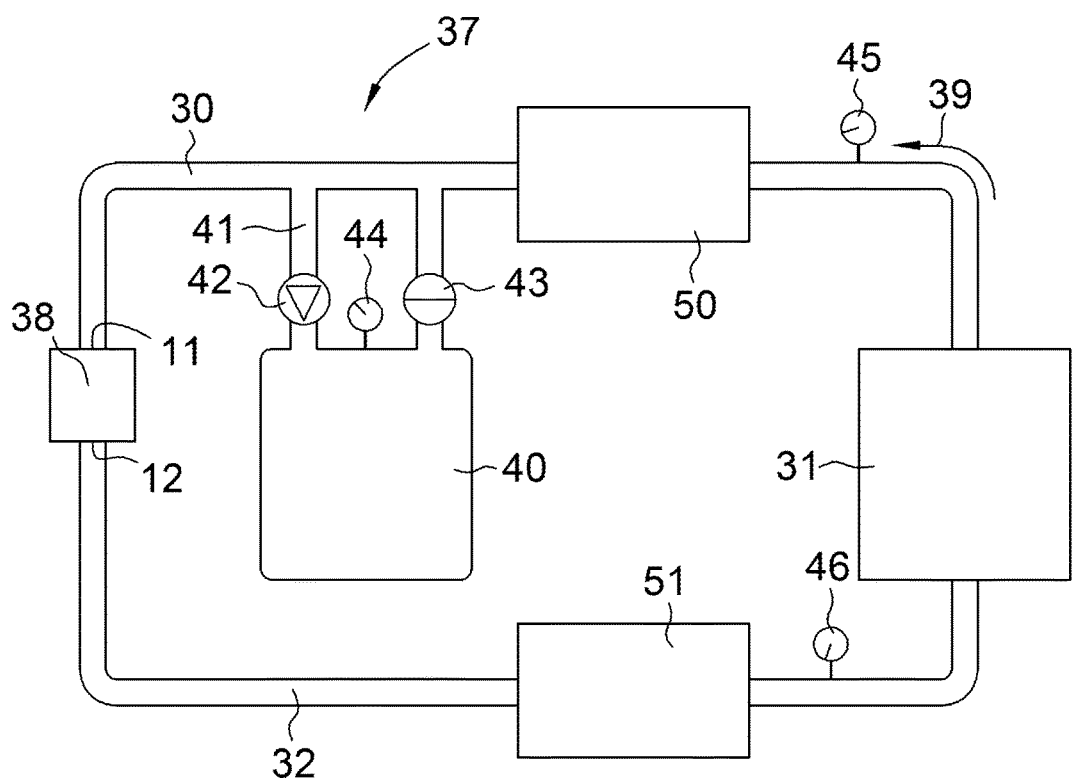
FIG. 7 is a schematic circuit diagram disclosing a forth exemplary embodiment of a pressure fluid handling system for an air conditioning system.

Reference is now made to FIG. 7 which disclose a forth embodiment. Only differences in relation to the embodiment according to FIG. 4 will be described. The embodiment disclosed in FIG. 7 is especially suitable for HVAC applications, i.e. air conditioning applications and the like, wherein the pressure fluid handling system 37 comprises a pressure fluid that at some locations are mostly a gas/vapour and at some locations are mostly a liquid, and at other locations a mixture of gas/vapour and liquid, i.e. the pressure fluid is a refrigerant.

In such applications the pressure sink 38 is constituted by an expansion valve or metering device/valve, i.e. a device that is configured to separate the primary pressure fluid route 30 from the secondary pressure fluid route 32 and configured to constantly or intermittently permit a restricted flow of pressure fluid to pass from the primary pressure fluid route 30 to the secondary pressure fluid route 32. The pressure sink 38 is thereby used to lower the pressure and also the temperature of the pressure fluid.

According to the embodiment disclosed in FIG. 7, the pressure fluid handling system 37 also comprises two heat exchange units, i.e. a condenser 50 located in the primary pressure fluid route 30 and an evaporator 51 located in the secondary pressure fluid route 32. The pressure fluid is a refrigerant.

Thus, when the pressure fluid leaves the compressor 31 it is a high pressure and high temperature gas, in the condenser 50 energy is removed to the environment from the pressure fluid transforming the high pressure and high temperature gas to a high pressure and high temperature liquid, in the pressure sink 38 the high pressure and high temperature liquid is transformed to a low pressure and low temperature liquid-gas mixture (mostly liquid), in the evaporator 51 energy is added from the environment to the pressure fluid transforming the low pressure and low temperature liquid-gas mixture to a low pressure and low temperature gas that once more enters the compressor 31.

Preferably, the first pressure fluid accumulator conduit 41 is connected to the primary pressure fluid route 30 at a location downstream the condenser 50 and the controllable component is configured to return the pressure fluid to the primary pressure fluid route 30 at a location downstream the condenser 50, i.e. at the location where the pressure fluid is mostly or entirely a liquid, and the pressure fluid accumulator may be constituted by an expansion vessel.

Conceivable Modifications of the Invention

The invention is not limited to only the abovementioned and embodiments shown in the drawings, which only have an illustrating and exemplifying purpose. This patent application is intended to cover all modifications and variants of the preferred embodiments described herein, and the present invention is consequently defined by the wording of the enclosed claims and the equipment can thus be modified in all conceivable ways within the framework of the enclosed claims.

It should also be pointed out that all information about/concerning terms such as above, below, upper, lower, etc. shall be interpreted/read with the equipment oriented in accordance with the figures, with the drawings oriented in such a way that the reference numbers can be read in a correct manner. Consequently, such terms indicates only relative relationships in the shown embodiments, which relationships can be changed if the equipment according to the invention is provided with another construction/design.

It should be pointed out that even if it is not explicitly stated that features from a specific embodiment can be combined with the features of another embodiment, this should be regarded as obvious when so is possible.

The invention claimed is:

1. A pressure fluid handling system comprising:
    a closed pressure fluid circuit including a compressor and a pressure sink connected to each other in series via (i) a primary pressure fluid route extending from the compressor to the pressure sink, and (ii) a secondary pressure fluid route extending from the pressure sink to the compressor;
    a pressure fluid accumulator connected to the pressure fluid circuit via a first pressure fluid accumulator conduit;
    a pump configured to pump pressure fluid from the pressure fluid circuit to the pressure fluid accumulator to decrease a pressure in the pressure fluid circuit;
    at least one controllable component for returning the pressure fluid from the pressure fluid accumulator to the pressure fluid circuit so as to increase the pressure in the pressure fluid circuit.

2. The pressure fluid handling system according to claim 1, wherein the first pressure fluid accumulator conduit connects the pressure fluid accumulator to the primary pressure fluid route.

3. The pressure fluid handling system according to claim 1, wherein the at least one controllable component is a first control valve.

4. The pressure fluid handling system according to claim 3, wherein said first control valve is configured to return the pressure fluid from the pressure fluid accumulator to the pressure fluid circuit via the primary pressure fluid route.

5. The pressure fluid handling system according to claim 1, wherein the at least one controllable component is a return pump configured to pump the pressure fluid from the pressure fluid accumulator to the pressure fluid circuit.

6. The pressure fluid handling system according to claim 5, wherein the pump and the return pump are embodied as a single bi-directional pump.

7. The pressure fluid handling system according to claim 1, wherein the compressor is a fixed displacement compressor.

8. The pressure fluid handling system according to claim 1, wherein the compressor is a scroll compressor.

9. The pressure fluid handling system according to claim 1, wherein the pump is an electric pump.

10. The pressure fluid handling system according to claim 1, wherein the primary pressure fluid route includes a condenser, and the secondary pressure fluid route includes an evaporator.

11. The pressure fluid handling system according to claim 10, wherein the pressure sink is an expansion valve.

12. The pressure fluid handling system according to claim 1, wherein the pressure sink is a pneumatic device.

13. The pressure fluid handling system according to claim 12, wherein the secondary pressure fluid route includes a chamber.

14. The pressure fluid handling system according to claim 12, wherein the at least one controllable component is a second control valve configured to return the pressure fluid from the pressure fluid accumulator to the pressure fluid circuit via the secondary pressure fluid route.

15. The pressure fluid handling system according to claim 14, wherein a non-return valve is arranged in said secondary pressure fluid route upstream of a position at which the second control valve connects to the secondary pressure fluid route, the non-return valve configured to prevent a backflow of the pressure fluid towards the pneumatic device.

16. The pressure fluid handling system according to claim 12, wherein the pneumatic device is configured to vary (i) the pressure in the pressure fluid circuit, and/or (ii) a pressure ratio between the primary pressure fluid route and the secondary pressure fluid route.

17. The pressure fluid handling system according to claim 12, wherein the pneumatic device is a valve actuator configured to drive an engine valve of a combustion engine.

18. A method for controlling the pressure fluid handling system according to claim 1, the method comprising:
pumping the pressure fluid from the pressure fluid circuit to the pressure fluid accumulator via the pump so as to decrease the pressure in the pressure fluid circuit; and
returning the pressure fluid from the pressure fluid accumulator to the pressure fluid circuit via the at least one controllable component so as to increase the pressure in the pressure fluid circuit.

19. The method according to claim 18, wherein the pumping of the pressure fluid includes pumping the pressure fluid from the primary pressure fluid route to the pressure fluid accumulator via the pump.

20. The method for controlling a pressure fluid handling system according to claim 18, wherein the returning of the pressure fluid includes returning gas from the pressure fluid accumulator to the primary pressure fluid route via the at least one controllable component.

21. A combustion engine comprising:
a combustion chamber;
a cylinder head;
a cylinder head chamber; and
the pressure fluid handling system according to claim 12.

22. The combustion engine according to claim 21, wherein the pneumatic device is a valve actuator configured to drive an engine valve so as to alternately open and close the combustion chamber.

23. The combustion engine according to claim 21, wherein the pressure fluid accumulator is an internal cavity arranged in a structural part of the cylinder head.

24. The combustion engine according to claim 21, wherein the cylinder head chamber is arranged in the secondary pressure fluid route.

* * * * *